Feb. 25, 1930.    W. T. McCABE    1,748,488
VACUUM PUMP
Filed Aug. 27, 1928

INVENTOR
WILLIAM T McCABE
BY R. S. Berry
ATTORNEY

Patented Feb. 25, 1930

1,748,488

UNITED STATES PATENT OFFICE

WILLIAM T. McCABE, OF LOS ANGELES, CALIFORNIA

VACUUM PUMP

Application filed August 27, 1928. Serial No. 302,306.

This invention relates to vacuum pumps and more particularly pertains to that type of pump wherein the flow of a liquid is utilized to create a vacuum.

An object of this invention is to provide a pump of this type which will operate at high efficiency.

Another object is to provide a small compact pump, consisting of but few parts.

Another object is to provide a pump that is adaptable to be mounted on any receptacle by means of a suitable hole in the walls of the receptacle, thus obviating the necessity of a plug, nipple or a flange connection. This is particularly advantageous in that it permits mounting the pump at any desired level on the receptacle to accommodate water levels or other conditions within the receptacle.

Another object is to provide a pump that can be changed to suit variable water pressures.

Another object is to provide a pump wherein the interior part that is subject to wear may be readily replaced.

Another object is to provide a pump wherein the interior part, that may be subjected to deleterious action caused by corrosive gases or liquids, passing therethrough, is formed of a material suitable to withstand such action.

Another object is to provide a pump that is easily accessible in case of repair, quickly demountable and sturdy in construction.

Briefly stated my invention resides in a liquid actuated vacuum pump that is characterized by simplicity and fewness of parts, arranged to operate at a high efficiency, and having means for adjusting to variable water pressures.

The foregoing statement recites the major objects of my invention which is more fully disclosed in the accompanying drawings in which:—

Figure 1:
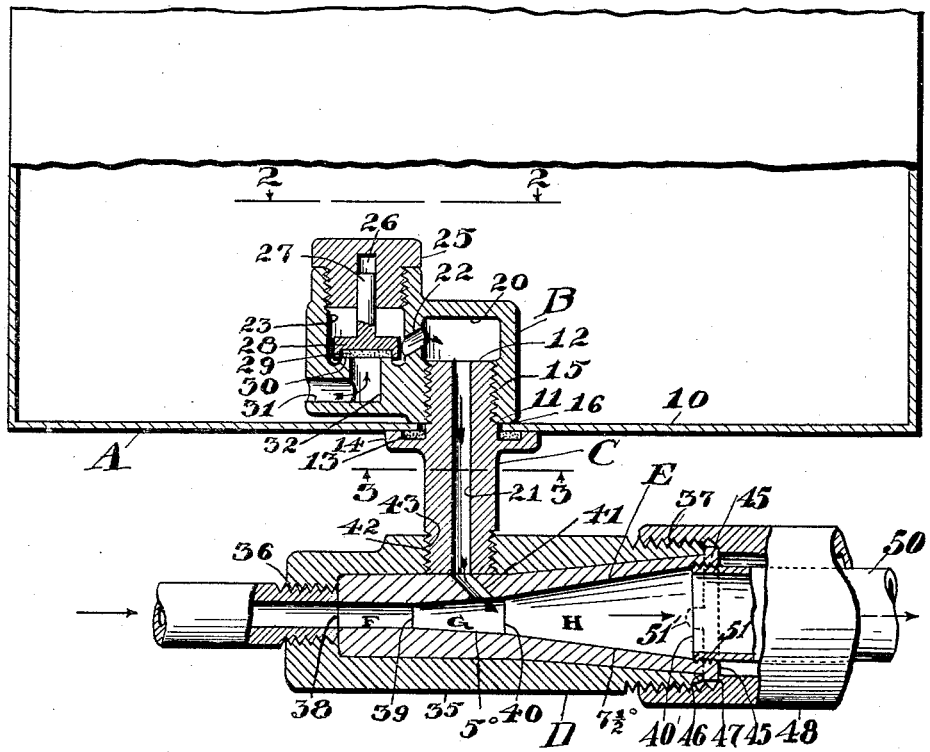
Figure 1 is a vertical section of my pump shown attached to a receptacle.
Figure 2:
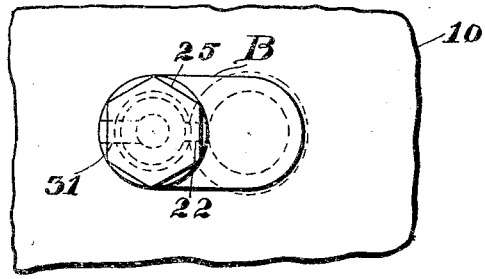
Figure 2 is a fragmentary top plan view of the same order.
Figure 3:
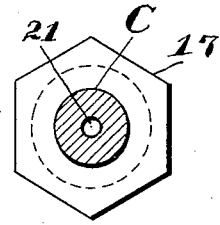
Figure 3 is section on line 3—3 of Figure 1.

In Figure 1, A designates a receptacle suitable to sustain a vacuum and having a bottom wall 10 upon which the upper element B of the vacuum pump is mounted within the receptacle. The bottom wall 10 is provided with a hole 11 adapted to pass the screw threaded end 12 of the element C of the pump, it being understood that the pump may be mounted on the side walls as well as the bottom wall of said receptacle. To make the joint leak proof I have provided a suitable gasket 13 carried in a recess in the flange 14 of the member C which gasket extends above the face of the flange 14, and bears against the outside of the wall 10. With this arrangement the joint may be made tight by applying a wrench to the hexagonal periphery 17 (shown in Figure 3) of the flange 14 and turning the screw threaded end 12 of element C up into the screw threaded opening 15 of the element B; the element B being provided with a suitable base 16 to form a bearing surface opposite the gasket 13.

The element B, more fully described, comprises chambers 20 and 23, having oppositely disposed openings; the opening to chamber 20 being closed by the screw threaded end 12 of element C as before stated and the opening to chamber 23 being closed by a screw threaded plug 25. This in effect forms the two chambers 20 and 23 respectively which are connected by a passage 22. The plug 25 which closes chamber 23 is equipped with a suitable recess 26 adapted to receive the stem 27 of the valve 28, the face of which valve is recessed to receive a gasket 29 of suitable material. The gasket 29 is for the purpose of forming a leak proof seating of the valve upon the seat 30 and being replaceable is also provided to take the wear of continued seating and unseating of said valve.

Underneath the valve 28 there is a smaller chamber 32 which opens to the interior of the receptacle A by means of the communicating passage 31. It is thus seen that a continuous air passage is provided through the element B by means of passage 31, chamber 32, chamber 23, passage 22, chamber 20; and that chamber 20 communicating with the bore 21 in element C is in direct communication with the pump designated by D.

The pump D comprises a casing 35 having means at one end for connecting to a liquid supply under pressure as shown at 36 and means at the opposite ends for connecting to a pipe 48 as shown at 37 to conduct the fluid from the casing. It being understood, however, that the casing may vent into the atmosphere if desirable. The casing D is formed interiorly to receive a replaceable inner shell E which shell is held in place by abutting the flange 45 of the inner shell against the end 46 of the casing D and holding it fixed in place by causing the shoulder 47 of the pipe 48 to bear thereagainst when said pipe has been mounted upon the end of the casing D. The outer walls of the inner shell E are flared at the outer end to allow for the expansion of the bore.

It will be noted that the bore of the inner shell E is divided into sections F, G and H, which are defined by lines 38—39—40 and 40'. Between lines 38 and 39 the bore is of uniform diameter, but between lines 39 and 40 the bore begins to expand.

In this case the walls of the bore taper at substantially 5 degrees to the line of flow. This angle is taken arbitrarily and is not intended in any way to confine the structure to this particular amount of taper.

From line 40 to 40' the taper is increased to substantially 7½ degrees to the line of flow. The definite degree of taper being used again to show approximately the relative difference in expansion in the two successive steps. At line 40' the bore is slightly restricted due to the introduction of the thin walled pipe 50 which is screw threaded into the end of the inner shell E as shown at 51. The purpose of the pipe 50 is to give the expansion of the liquid a sudden check and force it to fill the entire volume of the bore H. It has been found by experimenting that the internal diameter of said pipe 50 and the length thereof are important factors in controlling the efficiency of the pump.

It is understood that the pipe 50 extends interiorly of the pipe 48 and vents thereinto.

The inner shell E is equipped with a passage 41 which enters the inner bore thereof between the lines 39 and 40 or into the section G. The angle of entry being such that the flow of the liquid through the bore and the expansion given to the liquid will cause air to be drawn into and carried by the liquid in a diffused state. It is observed that the air is taken into the liquid after the expansion has started and that expansion continues up to line 40'. The consequence of which is to take full advantage of the liquid expansion to draw air.

The passage 41 communicates with passage 21 in the element C by means of a screw threaded opening 42 in the casing D adapted to receive the screw threaded end 43 of the element C.

In order to effect registration of passage 41 of the inner shell E with passage 21 of the element C a lug 51' is provided on the flange 45 which is adapted to seat in a recess in the casing D.

From the foregoing it is manifest that as air is drawn from passage 41, an evacuating process is set up in response to liquid flow through the bore of the inner shell E that communicates with the receptacle A. It is also obvious that the purpose of the gravity actuated valve 28 is to maintain any acquired vacuum in the receptacle A after the flow of the liquid in the pump D has been stopped in response to any controlling means, said controlling means not being shown in this disclosure. By the provision of the demountable inner shell E, a pump of standardized size may be adapted for use under various liquid pressures by equipping the pump with a shell E having a flared board or venturi of proper dimensions in proportion to the liquid pressure; a small venturi being employed with low pressures and a larger venturi being employed with high pressures. This obviates installing different size pumps for different pressures.

Wherever the term "expansion" as applied to a liquid is used throughout the specification and claims it will denote that condition of a liquid wherein the volume has been increased by having air diffused therethrough.

The foregoing description deals entirely with one embodiment of my invention. I am aware that modification may be made in the structure disclosed without departing from the specifications or the scope of the appended claims. I therefore reserve the right to such alterations as occur in the nature of refinements in my invention.

I claim:

1. A liquid actuated vacuum pump comprising a casing, a demountable shell in said casing, having a bore therein, which bore expands in the direction of liquid flow, a passage in said casing communicating with said bore, intermediate of its end, means for connecting said passage to a receptacle to be evacuated, and means for connecting said bore to a source of liquid under pressure.

2. A liquid actuated vacuum pump comprising a casing, means upon said casing for connecting to a source of liquid under pressure, and a detachable shell adapted to fit within said casing and having a bore therein, which bore expands in the direction of liquid flow, said casing having a passage intermediate its ends, adapted to receive a conduit, and said shell having a passage adapted to communicate with said first mentioned passage.

3. A liquid actuated vacuum pump comprising a casing, means upon said casing for connecting to a source of liquid under pressure, and a detachable shell adapted to fit within said casing and having a bore therein, which bore expands in successive stages in the direction of liquid flow, said casing having a passage intermediate its ends adapted to receive a conduit, and said shell having a passage adapted to communicate with said first mentioned passage.

4. A liquid actuated vacuum pump comprising a casing, means upon said casing for connecting to a source of liquid under pressure, and a detachable shell adapted to fit within said casing and having a bore therein, which bore expands in successive stages in the direction of liquid flow, means for reducing said expansion at the termination of the last stage, said casing having a passage intermediate its ends adapted to receive a conduit, and said shell having a passage adapted to communicate with said last mentioned passage.

5. A liquid actuated vacuum pump comprising a casing, means upon said casing for connecting to a source of liquid under pressure, and a detachable shell adapted to fit within said casing and having a bore therein, which bore expands in the direction of liquid flow, said casing having a passage intermediate its ends, adapted to receive a conduit, said shell having a passage adapted to communicate with said first mentioned passage, and a uni-directional valve interposed in said conduit.

In testimony whereof, I have affixed my signature.

WILLIAM T. McCABE.